United States Patent
Lin

(10) Patent No.: US 7,021,948 B2
(45) Date of Patent: Apr. 4, 2006

(54) COMBINATION DEVICE AND ELECTRONIC DEVICE UTILIZING THE SAME

(75) Inventor: Ying-Liang Lin, Taoyuan (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 11/070,171

(22) Filed: Mar. 3, 2005

(65) Prior Publication Data

US 2005/0196990 A1 Sep. 8, 2005

(30) Foreign Application Priority Data

Mar. 4, 2004 (TW) ............... 93105679 A

(51) Int. Cl.
*H01R 13/62* (2006.01)
(52) U.S. Cl. ........................ 439/159; 361/685; 439/157
(58) Field of Classification Search ................ 439/159, 439/160, 152, 155, 157, 372; 361/685, 686
See application file for complete search history.

(56) References Cited

U.S. PATENT DOCUMENTS 4,778,395 A * 10/1988 Narita ........................ 439/71
2003/0211763 A1* 11/2003 Wu ............................ 439/152

* cited by examiner

*Primary Examiner*—Tho D. Ta
*Assistant Examiner*—Vanessa Girardi
(74) *Attorney, Agent, or Firm*—Birch, Stewart, Kolasch & Birch, LLP

(57) ABSTRACT

An electronic device and a combination device thereof. The electronic device comprises a body, a rotation assembly, a push assembly, a battery, and a data card. The body comprises a receiving room. The rotation assembly is rotatably disposed on the body. The push assembly is disposed on the body, and is abutted by the rotation assembly. The push assembly is moved between a first position and a second position by the rotation assembly. The battery is detachably disposed in the body. When the push assembly is in the first position, it engages the battery. The data card is detachably disposed in the receiving room of the body. When the push assembly is in the second position, the data card is ejected from the receiving room by the push assembly.

19 Claims, 9 Drawing Sheets

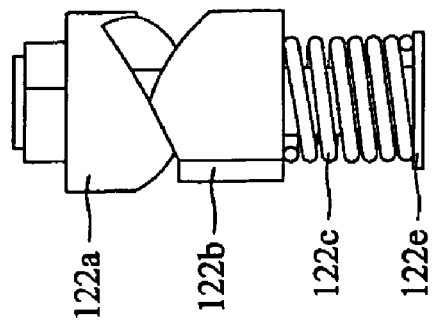
FIG. 4a
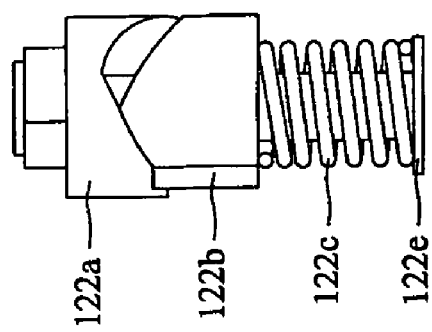
FIG. 4b
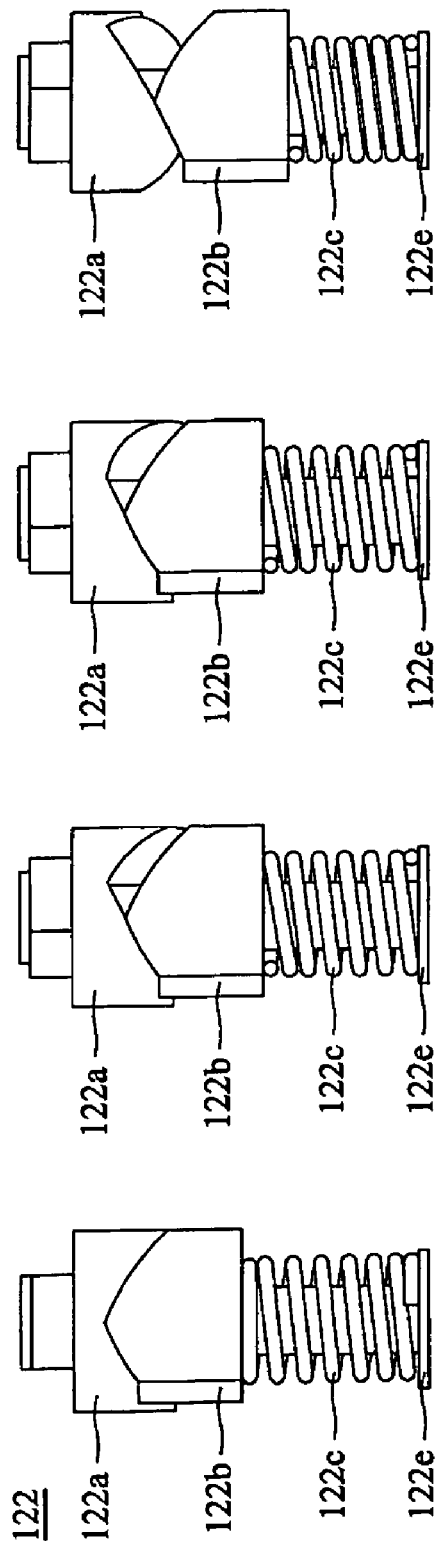
FIG. 4c
FIG. 4d
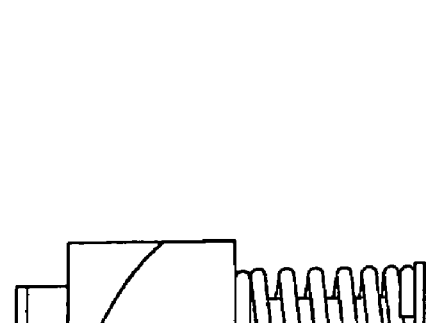
FIG. 4e
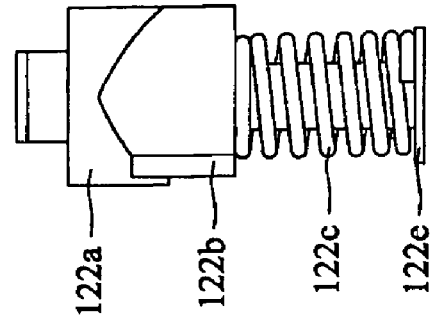
FIG. 4f
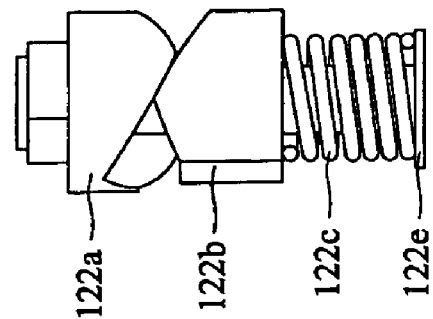
FIG. 4g
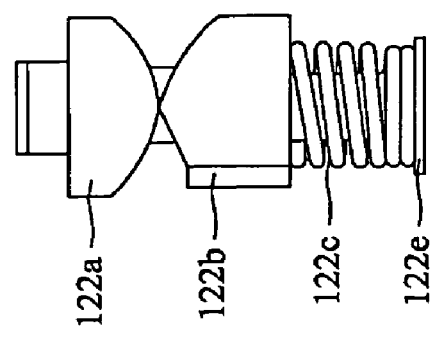

US 7,021,948 B2

COMBINATION DEVICE AND ELECTRONIC DEVICE UTILIZING THE SAME

BACKGROUND

The invention relates to a combination device for an electronic device, and in particular, to a combination device that engages a battery and ejects a data card using a single mechanism.

A conventional electronic device, such as a mobile phone, often comprises a mechanism engaging a battery, and a separate mechanism engaging a data card such as a SIM card. The data card is inserted into a housing of the electronic device via a port therein. Accordingly, there is an exposed area located correspondingly to the port on the housing to receive the data card. Since the size of the exposed area of the housing is usually the same as the data card, EMI emission from the exposed area might be a big issue in this design. Furthermore, the exposed area for receiving the data card could occupy certain area of the print circuit board (PCB) and thus the size of the PCB is hardly reduced.

SUMMARY

Accordingly, an embodiment of the invention provides an electronic device comprising a body, a rotation assembly, a push assembly, a battery, and a data card. The body comprises a receiving room. The rotation assembly is rotatably disposed on the body. The push assembly is disposed on the body, and is abutted by the rotation assembly. The push assembly is moved between a first position and a second position by the rotation assembly. The battery is detachably disposed in the body. When the push assembly is in the first position, it engages the battery. The data card is detachably disposed in the receiving room of the body. When the push assembly is in the second position, the data card is ejected from the receiving room by the push assembly.

The push assembly may also disengage from the battery when moved to a third position between the first position and the second position. In this case, the push assembly comprises a moving member and a rotation member. The moving member abuts the rotation assembly. When the push assembly is in the first position, the moving member engages the battery. The rotation member abuts the data card. When the push assembly is in the second position, the rotation member abuts the moving member so that the data card is ejected by the rotation member. The body comprises a first support combined with the rotation member, a second support fixing the moving member, a through hole for the moving member in the first position projecting from the body, and a stopper to limit the movement of the push assembly within a predetermined range.

The rotation assembly may also comprise a roller and a hinge. The roller abuts the push assembly. The hinge is disposed in the roller to maintain the roller in a predetermined position, and comprises a first cam, a second cam, a spring, a housing, and a pin. The first cam is fixed to the body. The second cam abuts the first cam in a manner such that the second cam is rotatable relative to the first cam. The spring abuts the second cam to maintain contact between the first cam and the second cam. The housing receives the first cam, the second cam, and the spring. The pin combines the first cam, the second cam, the spring, and the housing. The body further comprises a receiving hole to receive an end of the roller, and a fixed hole to fix an end of the first cam.

Furthermore, the electronic device comprises a connector disposed in the body. The data card abuts the connector when the push assembly is in the first position.

The embodiment also provides an electronic device comprising a body, a battery, and a data card. The combination device comprises a rotation assembly and a push assembly. The rotation assembly is rotatably disposed on the body. The push assembly is disposed on the body to be abutted by the rotation assembly. The push assembly is moved between a first position and a second position by the rotation assembly. The push assembly engages the battery when the push assembly is in the first position. The data card is ejected by the push assembly when the push assembly is in the second position.

BRIEF DESCRIPTION OF THE DRAWINGS

The present invention can be more fully understood by reading the subsequent detailed description and examples with references made to the accompanying drawings, wherein:

FIG. 3c is an exploded view of the rotation assembly in FIG. 3a;

FIGS. 4a–4g are schematic views of a hinge in FIG. 3a;

DETAILED DESCRIPTION

Figure 1:
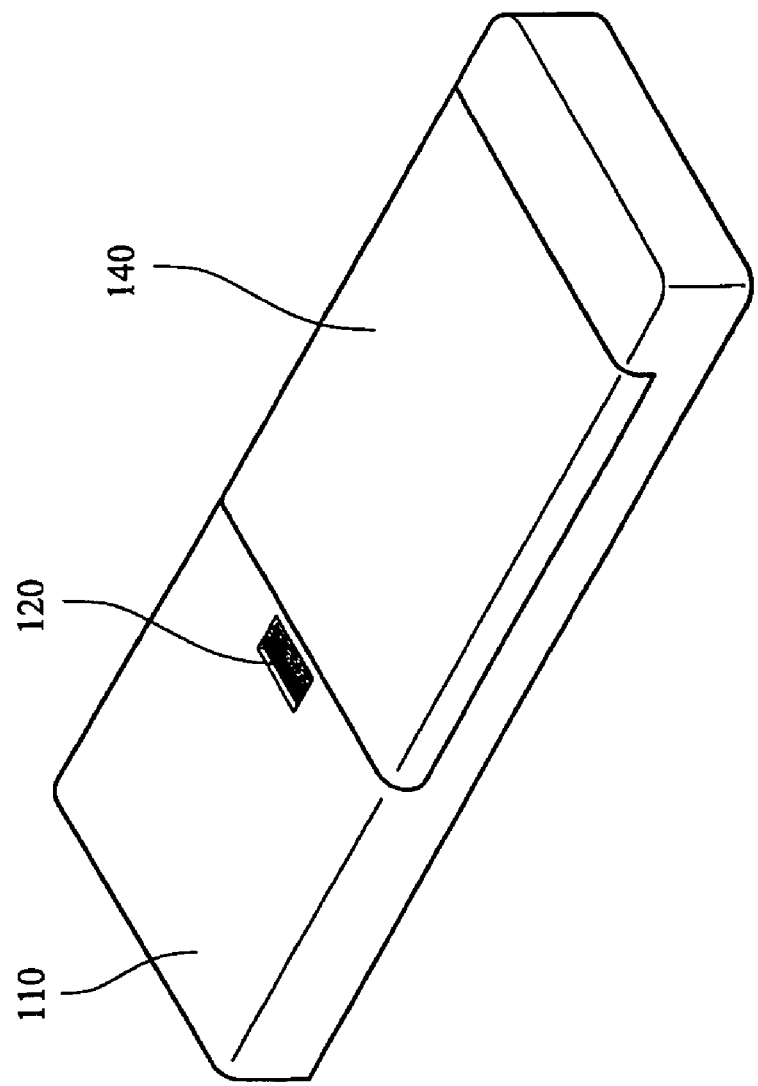
FIG. 1 is a schematic view of an electronic device as disclosed in an embodiment of the invention.
Figure 5:
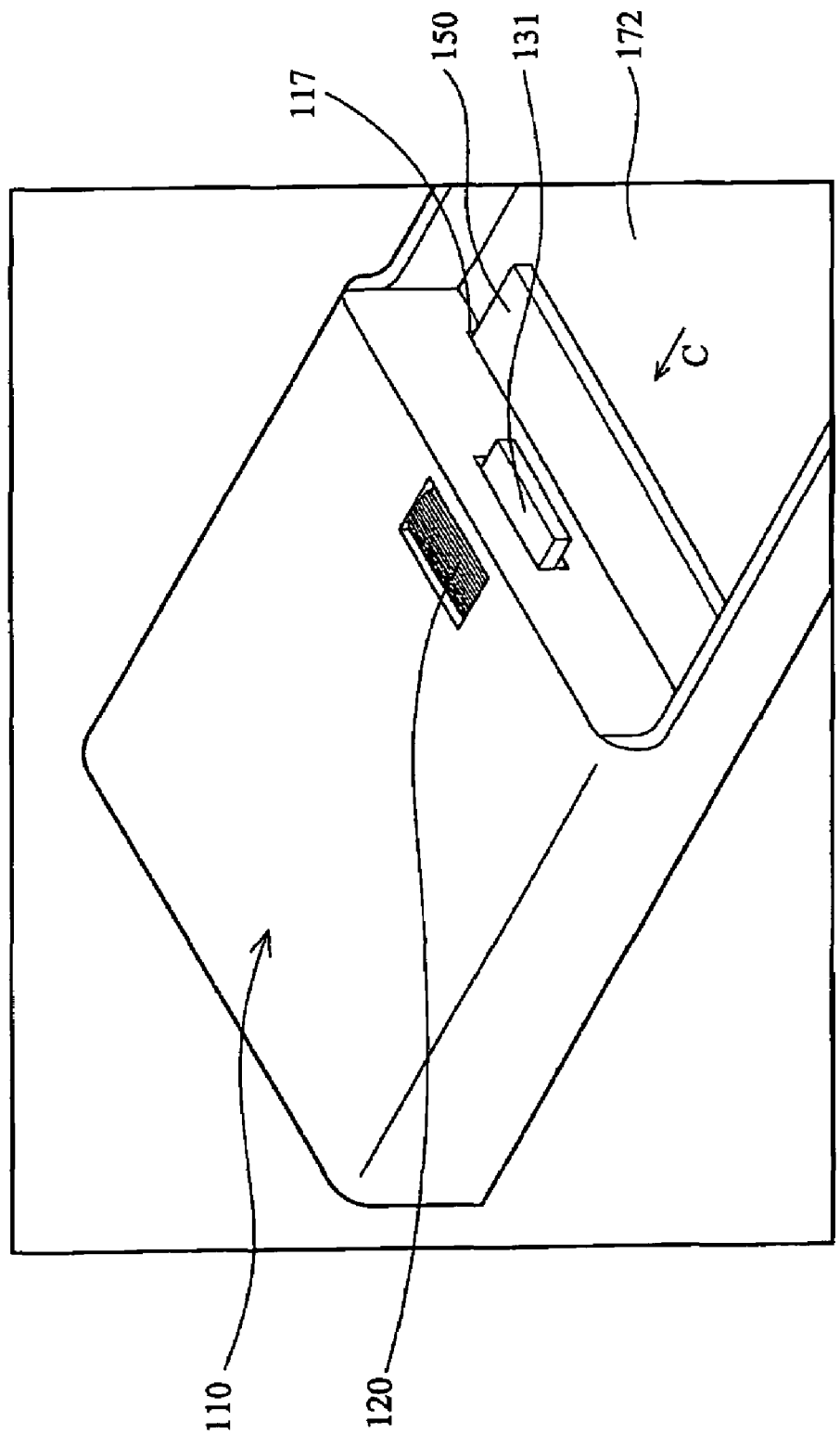
FIG. 5 is a schematic view of a data card inserted into the body.
Figure 6A:
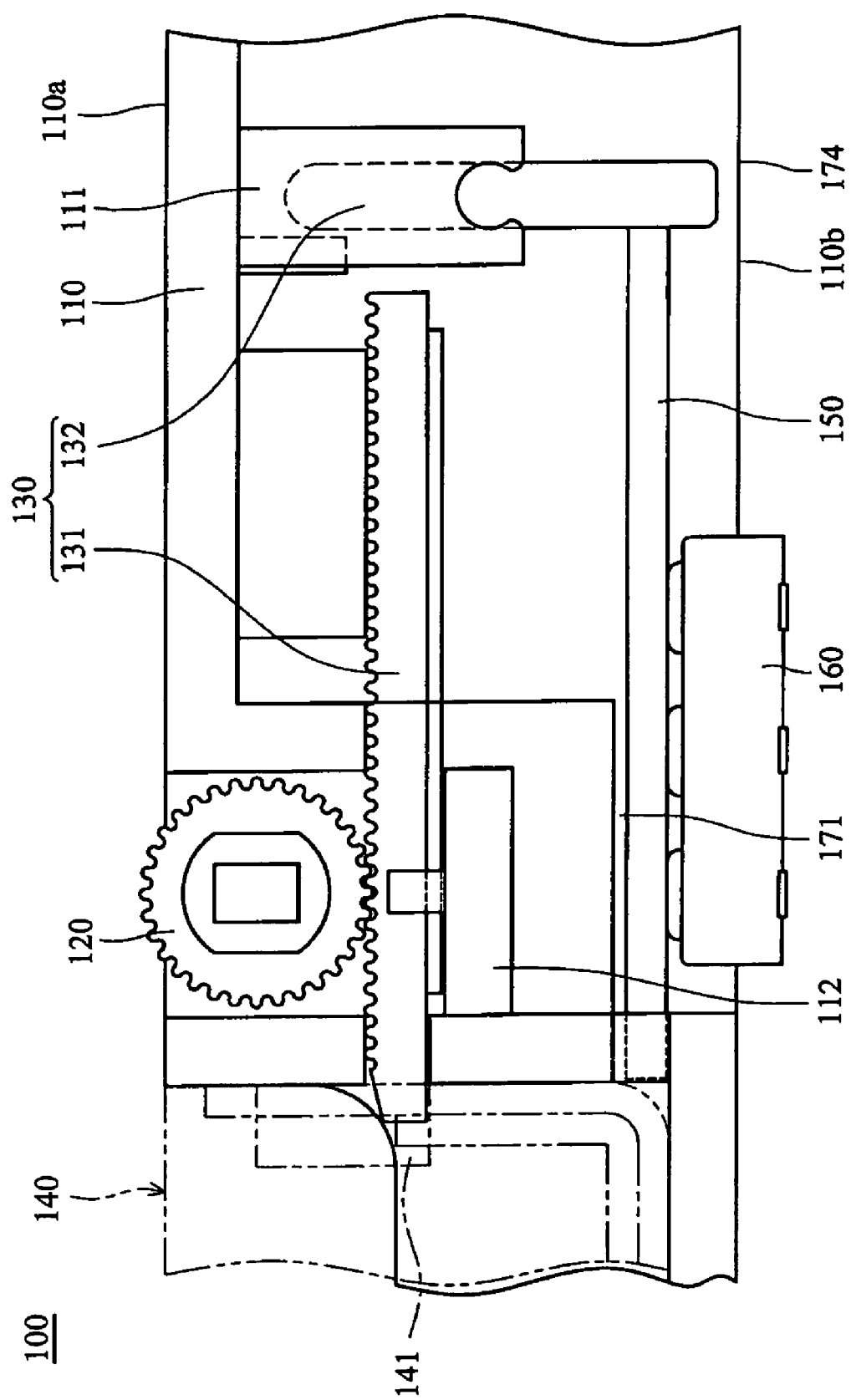
FIGS. 6a–6c are schematic views of an combination device as disclosed in an embodiment of the invention.

FIGS. 1 and 6a illustrate an electronic device 100 as disclosed in an embodiment of the invention. The electronic device 100 comprises a body 110, a rotation assembly 120, a push assembly 130, a battery 140, a data card 150, and a connector 160. The rotation assembly 120 and the push assembly 130 constitute a combination device. As shown in FIGS. 5 and 6a, the battery 140 is detachably disposed in a first receiving room 171 of the body 110, and the data card 150 detachably disposed in a second receiving room 172 of the body 110. The battery 140 comprises an engaging portion 141 at one side. The connector 160 is disposed in the body 110, and is abutted by the data card 150.

Figure 2A:
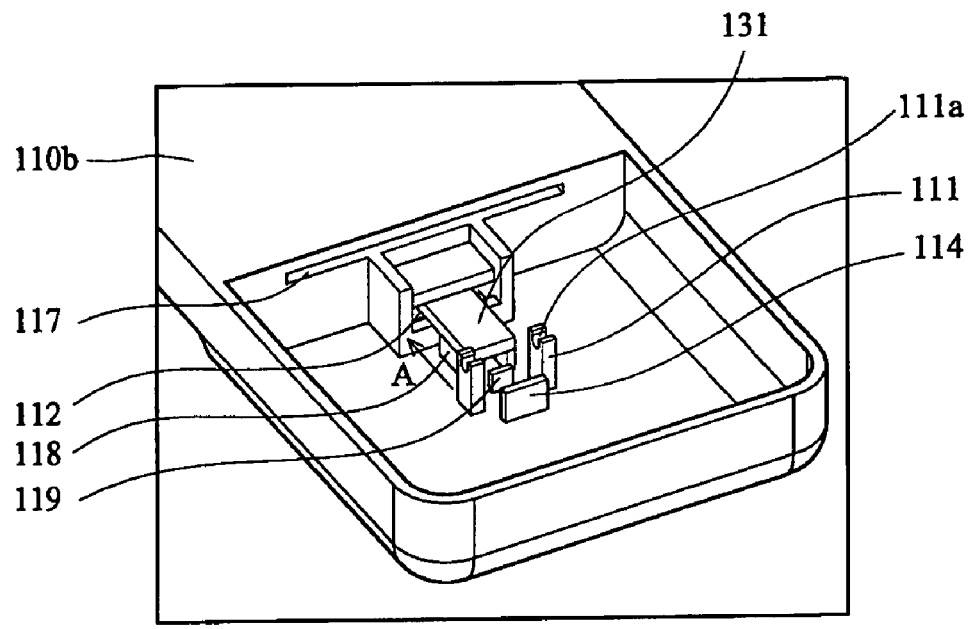
FIGS. 2a and 2b are schematic views of a moving member on a body in FIG. 1.
Figure 2B:
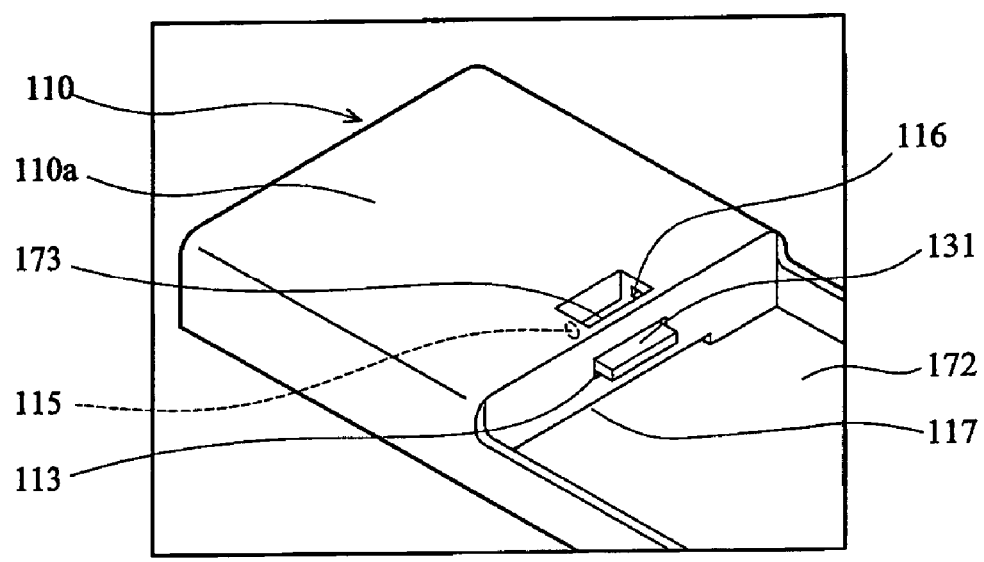

Referring to FIGS. 2a, 2b and 6a, the body 110 comprises the first receiving room 171, the second receiving room 172, two first supports 111, a second support 112, a first through hole 113, two stoppers 114, 119, a receiving hole 115, a fixed hole 116, a second through hole 117, two holding members 118, and a third receiving room 173.

Figure 2C:
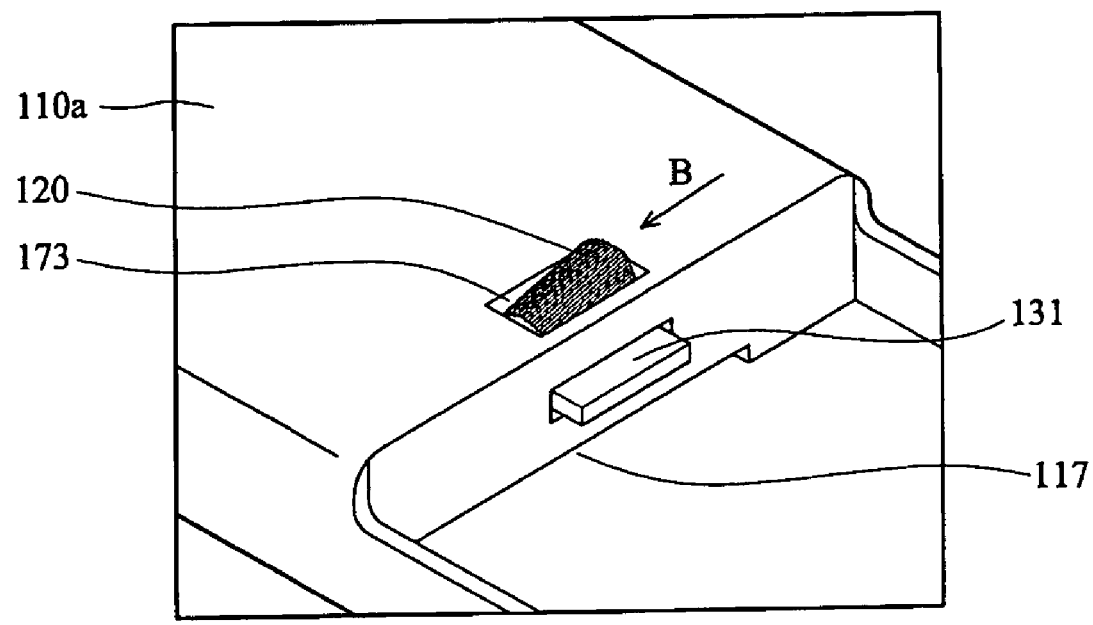
FIG. 2c is a schematic view of a rotation assembly on the body in FIG. 1.

As shown in FIG. 2a, the first supports 111 and the second support 112 are located inside the body 110. Each first support 111 comprises a notch 111a combining with a rotation member 132 (refer to FIG. 2d and FIG. 2c) of the rotation assembly 120. The second support 112 holds a moving member 131 of the push assembly 130.

As shown in FIG. 2b, the first through hole 113 and the second through hole 117 are formed at one wall of the second receiving room 172. The moving member 131 is exposed by the body 110 through the first through hole 113. The data card 150 is inserted into the first receiving room 171 of the body 110 through the second through hole 117.

Figure 6B:
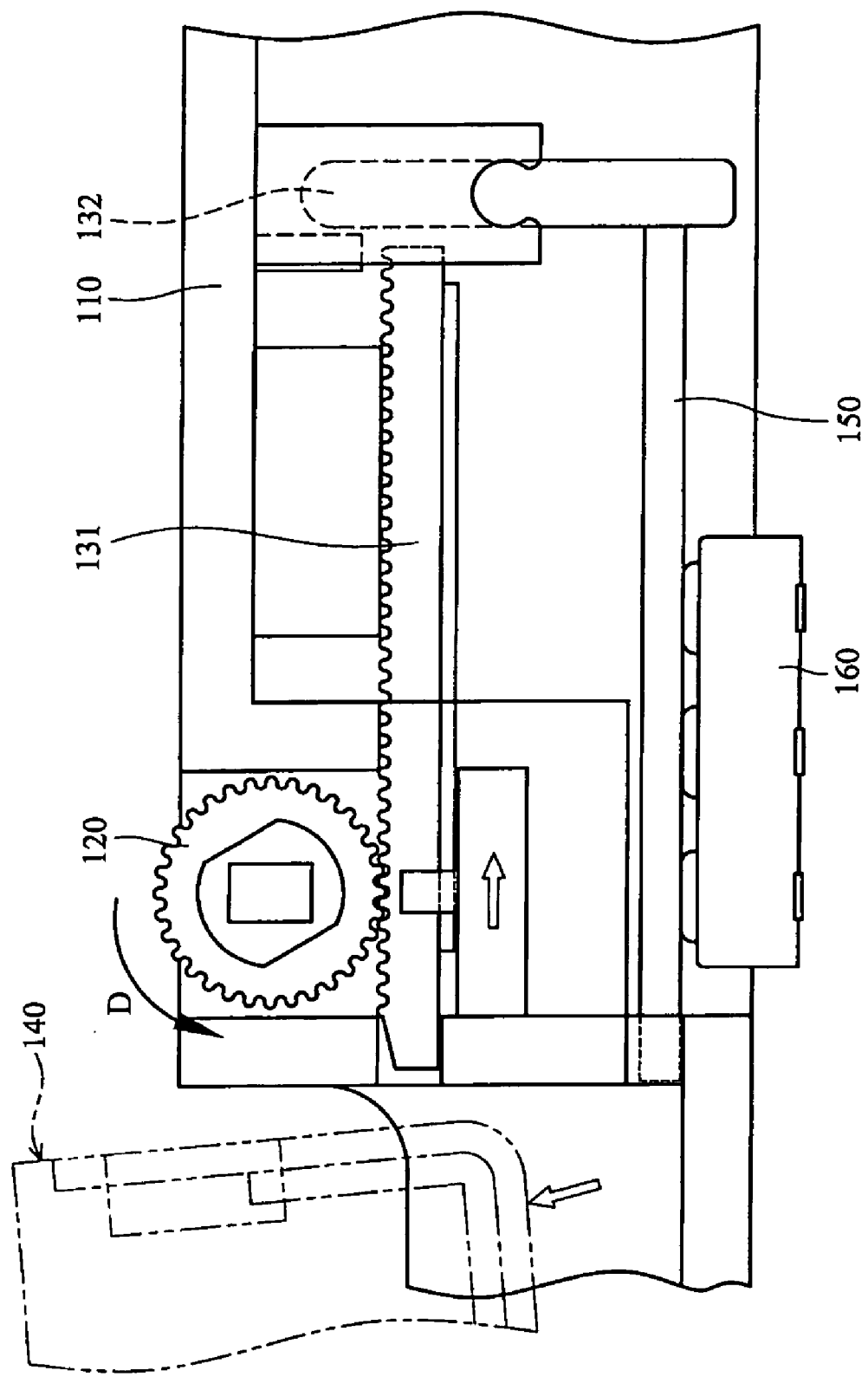
Figure 6C:
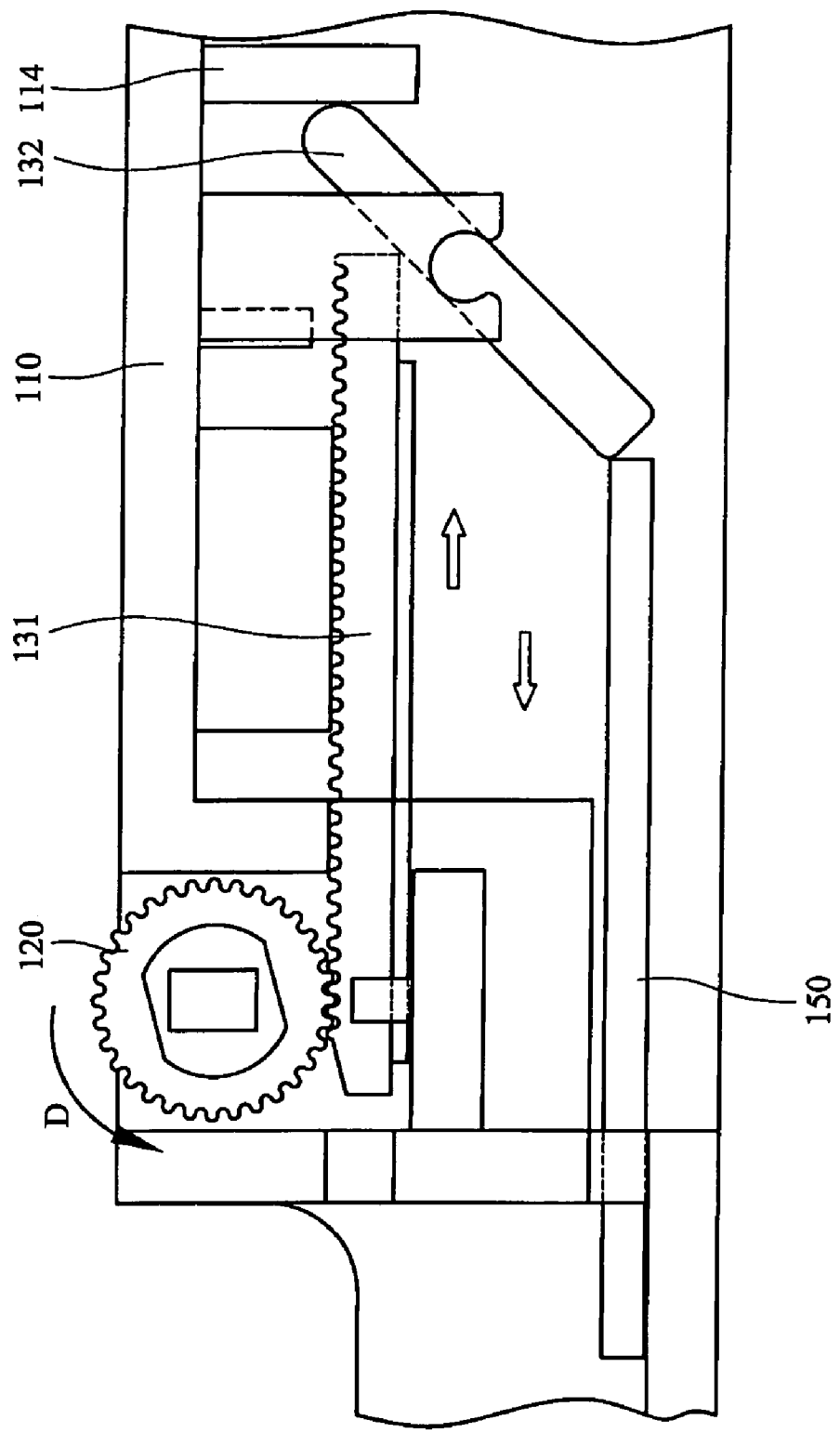

Referring to FIG. 2a and FIG. 6c, the stoppers 114, 119 and the holding members 118 are located inside the body 110. The stoppers 114, 119 limit the rotation of the rotation member 132 of the push assembly 130 within a predetermined range. The holding members 118 limit the movement of the moving member 131 of the push assembly 130 within a predetermined range.

Figure 3A:
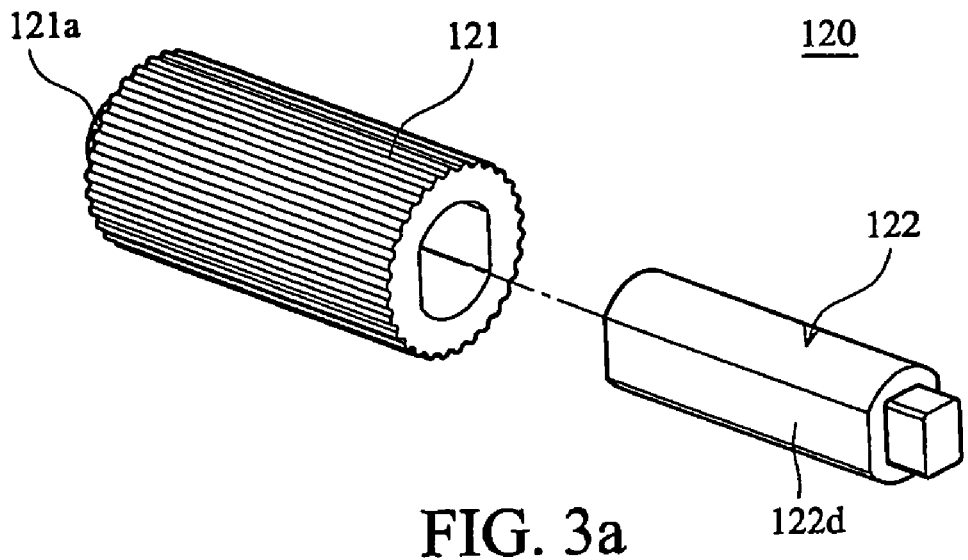
FIGS. 3a and 3b are schematic views of the rotation assembly in FIG. 1.
Figure 3B:
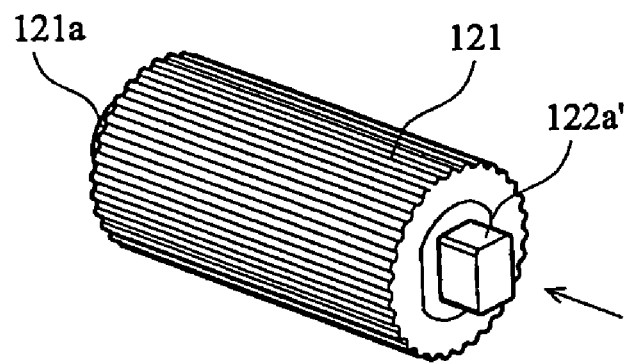

Referring to FIGS. 2b, 3a and 3b, the receiving hole 115 is formed at one wall of the third receiving room 173, and is used to receive an end 121a of a roller 121 of the rotation assembly 120. The fixed hole 116 is located opposite to the receiving hole 115, and is used to fix an end 122a' of a first cam 122a of a hinge 122 of the rotation assembly 120.

As shown in FIG. 6a, the first receiving room 171 is located inside the body 110. As shown in FIG. 2b, the second and third receiving rooms 172, 173 are formed on the body 110.

As shown in FIG. 1, the rotation assembly 120 is rotatably disposed in the third receiving room 173 of the body 110. As shown in FIGS. 3a and 3b, the rotation assembly 120 comprises a roller 121 and a hinge 122. As shown in FIG. 6a, the rotation assembly 120 is abutted by the moving member 131 of the push assembly 130. Referring to FIG. 3a, the roller 121 comprises the end 121a to be combined with the receiving hole 115 of the body 110.

As shown in FIG. 3b, the hinge 122 is disposed in the roller 121 to maintain the roller 121 in a predetermined position. As shown in FIGS. 3a and 4a, the hinge 122 comprises a first cam 122a, a second cam 122b, a spring 122c, a housing 122d, and a pin 122e.

Referring to FIG. 3b, the first cam 122a comprises the end 122a' to be fixed to the fixed hole 116 of the body 110. The second cam 122b abuts the first cam 122a in a manner such that the second cam 122b is rotatable relative to the first cam 122a. The spring 122c abuts the second cam 122b to maintain contact between the first cam 122a and the second cam 122b. The housing 122d receives the first cam 122a, the second cam 122b, the spring 122c, and the pin 122e. The pin 122e combines the first cam 122a, the second cam 122b, the spring 122c, and the housing 122d.

FIGS. 4a–4g illustrate operation of the hinge 122. When an external force is applied to the second cam 122b to make it rotate relatively to the first cam 122a, the second cam 122b slides along an abutment surface of the first cam 122a to compress the spring 122c. When the second cam 122b is rotated within a range shown in FIGS. 4a–4d, it returns to the state shown in FIG. 4a by the spring 122c after removing the external force. If the second cam 122b is rotated to the state shown in FIG. 4e, it will rotate to another state shown in FIG. 4g by the spring 122c after removing external force. However, in the embodiment, the stopper 114 is disposed in the body 110 to prevent the second cam 122b from rotating to the state shown in FIG. 4e. Besides, the first cam 122a is rotated while the second cam 122b is fixed in the embodiment.

Referring to FIG. 6a, the push assembly 130 is disposed in the body 110, and is abutted by the rotation assembly 120. The push assembly 130 is moved between an engagement position (shown in FIG. 6a and hereinafter referred as to a first position), a separate position (shown in FIG. 6b and hereinafter referred as to a third position) and an ejection position (shown in FIG. 6c and hereinafter referred as to a second position) by the rotation assembly 120.

As shown in FIG. 6a, the push assembly 130 comprises the moving member 131 and the rotation member 132. The moving member 131 is abutted by the roller 121 of the rotation assembly 120, and is moved along a predetermined path in the body 110 by the second support 112 and the holding members 118. The moving member 131 is exposed by the body 110 via the first through hole 113. The rotation member 132 abuts the data card 150 and the moving member 131 respectively. The rotation member 132 comprises a rod 132a at both sides combining with the notch 111a of the first support 111 in the body 110. The rotation member 132 is rotatably disposed in the body 110.

Figure 2D:
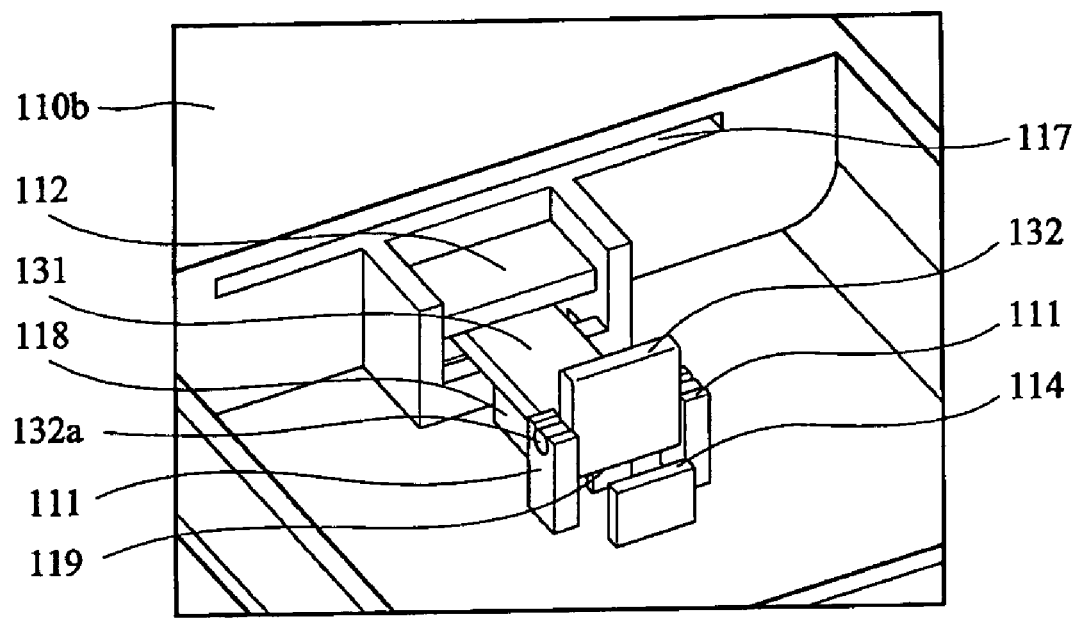
FIG. 2d is a schematic view of a rotation member on the body in FIG. 1.
Figure 3C:
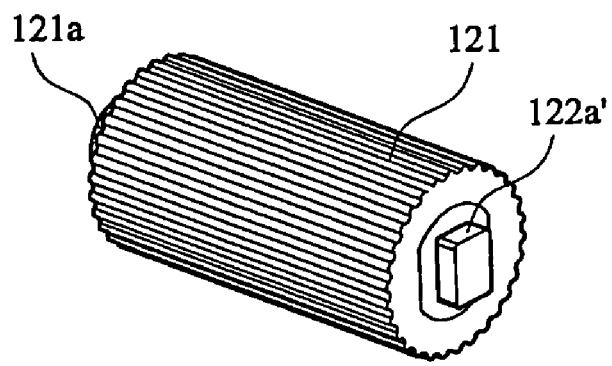

Referring to FIGS. 2a, 2b, and 6a, the body 110 comprises a first side 110a and a second side 110b opposite thereto. The third receiving room 173 is formed on the first side 110a, and a cover 174 is disposed on the second side 110b. When the combination device is installed into the body 110, the moving member 131 is placed in the body 110 from the second side 110b, and inserted into the second support 112 as shown by arrow A in FIG. 2a to project through the first through hole 113, as shown in FIG. 2b. The rotation assembly 120 is then placed in the third receiving room 173 of the body 110 from first side 110a. To assemble the rotation assembly 120, the end 121a of the roller 121 is first inserted into the receiving hole 115 of the body 110. The end 122a' of the first cam 122a is then pressed as shown by arrow B in FIG. 2c so that the rotation assembly 120 is placed inside the third receiving room 173 by the end 122a' inserting into the fixed hole 116, as shown in FIGS. 3b and 3c. As shown in FIG. 2d, the rotation member 132 is finally located on the first supports 111 from the second side 110b, and the cover 174 is combined with the body 110 to accomplish assembly of the combination device.

To situate the data card 150 and the battery 140 in the body 110, the data card 150 is first inserted into the first receiving room 171 of the body 110 via the second through hole 117 as shown by arrow C in FIG. 5. The battery 140 is then placed in the second receiving room 172 of the body 110, as shown in FIGS. 1 and 6a. At this time, the data card 150 is abutted by the connector 160, and is electrically connected thereto. The moving member 131 in the first position engages the engaging portion 141 of the battery 140.

To remove the battery 140 from the body 110, the rotation assembly 120 is rotated as shown by arrow D in FIG. 6b to move the moving member 131 to the third position from the first position. At this time, as shown in FIG. 6b, the moving member 131 of the push assembly 130 is separated from the engaging portion 141 of the battery 140 so that the battery 140 can be removed. To remove the data card 150 from the body 110, the rotation assembly 120 is rotated as shown by arrow D in FIG. 6c to move the moving member 131 to the second position. At this time, as shown in FIG. 6c, the rotation member 132 is rotated by the moving member 131 to eject the data card 150 from the first receiving room 171.

In an embodiment of the invention, the data card is disposed in a space between a printed circuit board and the moving member engaging the battery, thus reducing the exposed area of the printed circuit board. An embodiment of the combination device engages the battery and ejects the data card, and may simplify structure.

Moreover, since the battery and the data card can be removed by rotating the rotation assembly, it is convenient for the user. Specifically, the battery can be kept engaging with the push assembly via the hinge of the rotation assembly. Also, the battery and the data card can be removed respectively by rotating the rotation assembly to different predetermined angles.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device comprising:
   a body comprising a receiving room;
   a rotation assembly rotatably disposed on the body;
   a push assembly disposed on the body to abut the rotation assembly, wherein the push assembly is moved between a first position and a second position by the rotation assembly;
   a battery detachably disposed in the body, wherein the push assembly engage the battery when the push assembly is in the first position; and
   a data card detachably disposed in the receiving room of the body, wherein the data card is ejected from the receiving room by the push assembly when the push assembly is in the second position.

2. The electronic device as claimed in claim 1, wherein the push assembly disengages from the battery when the push assembly is moved to a third position between the first position and the second position.

3. The electronic device as claimed in claim 1, wherein the body further comprises a stopper to limit the movement of the push assembly within a predetermined range.

4. The electronic device as claimed in claim 1, further comprising a connector disposed in the body, wherein the data card abuts the connector when the push assembly is in the first position.

5. The electronic device as claimed in claim 1, wherein the push assembly comprises:
   a moving member abutting the rotation assembly, wherein the moving member engages the battery when the push assembly is in the first position; and
   a rotation member abutting the data card, wherein the rotation member is abutted by the moving member so that the data card is ejected from the receiving room by the rotation member when the push assembly is in the second position.

6. The electronic device as claimed in claim 5, wherein the body further comprises a through hole through which the moving member in the first position projects from the body.

7. The electronic device as claimed in claim 5, wherein the body further comprises a first support combined with the rotation member.

8. The electronic device as claimed in claim 7, wherein the body further comprises a second support to hold the moving member.

9. The electronic device as claimed in claim 1, wherein the rotation assembly comprises:
   a roller abutted by the push assembly; and
   a hinge disposed in the roller to maintain the roller in a predetermined position.

10. The electronic device as claimed in claim 9, wherein the body further comprises a receiving hole to receive an end of the roller.

11. The electronic device as claimed in claim 9, wherein the hinge comprises:
    a first cam fixed in the body;
    a second cam abutting the first cam in a manner such that the second cam is rotatable relative to the first cam; and
    a spring abutting the second cam to maintain contact between the first cam and the second cam.

12. The electronic device as claimed in claim 11, wherein the body further comprises a fixed hole to fix an end of the first cam.

13. The electronic device as claimed in claim 11, wherein the hinge further comprises:
    a housing receiving the first cam, the second cam, and the spring; and
    a pin combining the first cam, the second cam, the spring, and the housing.

14. A combination device for an electronic device, wherein the electronic device comprises a body, a battery, and a data card, and the combination device comprises:
    a rotation assembly rotatably disposed on the body; and
    a push assembly disposed on the body to abut the rotation assembly, wherein the push assembly is moved between a first position and a second position by the rotation assembly, the push assembly engages the battery when the push assembly is in the first position, the data card is ejected from the receiving room by the push assembly when the push assembly is in the second position.

15. The combination device as claimed in claim 14, wherein the push assembly disengages the battery when the push assembly is moved to a third position between the first position and the second position.

16. The combination device as claimed in claim 14, wherein the push assembly comprises:
    a moving member abutting the rotation assembly, wherein the moving member engages the battery when the push assembly is in the first position; and
    a rotation member abutting the data card, wherein the rotation member abuts the moving member so that the data card is ejected from the body by the rotation member when the push assembly is in the second position.

17. The combination device as claimed in claim 14, wherein the rotation assembly comprises:
    a roller abutting the push assembly; and
    a hinge disposed in the roller to maintain the roller in a predetermined position.

18. The combination device as claimed in claim 17, wherein the hinge comprises:
    a first cam fixed in the body;
    a second cam abutting the first cam in a manner such that the second cam is rotatable relative to the first cam; and
    a spring abutting the second cam to maintain contact between the first cam and the second cam.

19. The combination device as claimed in claim 18, wherein the hinge further comprises:
    a housing receiving the first cam, the second cam, and the spring; and
    a pin combining the first cam, the second cam, the spring, and the housing.

* * * * *